(12) United States Patent
Lau et al.

(10) Patent No.: US 6,172,128 B1
(45) Date of Patent: Jan. 9, 2001

(54) NANOPOROUS POLYMERS CROSSLINKED VIA CYCLIC STRUCTURES

(75) Inventors: Kreisler Lau, Sunnyvale, CA (US); Tian-An Chen, Duluth, GA (US); Roger Leung, San Jose, CA (US)

(73) Assignee: Honeywell International Inc., Morristown, NJ (US)

( * ) Notice: Under 35 U.S.C. 154(b), the term of this patent shall be extended for 0 days.

(21) Appl. No.: 09/544,722

(22) Filed: Apr. 6, 2000

Related U.S. Application Data

(60) Provisional application No. 60/128,533, filed on Apr. 9, 1999.

(51) Int. Cl.[7] .................................................. C08J 9/02
(52) U.S. Cl. ......................... 521/77; 521/134; 521/138; 521/139; 521/181; 521/182; 521/184; 525/450; 525/534
(58) Field of Search ........................... 521/134, 77, 138, 521/139, 181, 182, 184; 525/450, 534

(56) References Cited

U.S. PATENT DOCUMENTS 4,661,558   4/1987   Bell et al. ........................... 525/36
5,965,679   10/1999  Godschalx et al. .................. 526/281

*Primary Examiner*—Morton Foelak
(74) *Attorney, Agent, or Firm*—Robert D. Fish; Fish & Associates, LLP

(57) ABSTRACT

Nanoporous polymeric materials are fabricated in which polymeric strands are crosslinked via ring structures. Preferred ring structures are formed de novo during crosslinking, and at least some of the ring structures are preferably included in the backbones of the strands. At least one of the ring structures may advantageously comprise an aromatic structure, and may more advantageously comprise a benzyl moiety. Especially preferred polymers comprise a poly(arylene ether) synthesized from a difluoroaromatic portion and an aromatic bisphenolic portion. In another preferred aspect, the difluoroaromatic portions of the poly (arylene ether) carry at least two different crosslinking functionalities. In an even more preferred aspect, the crosslinking functionalities comprise an ethynyl and a tetracyclone. Nanoporosity is preferably introduced by thermolyzing one or more thermolabile portions in the crosslinked polymer. An especially preferred thermolabile portion comprises ethylene glycol-poly(caprolactone).

20 Claims, 10 Drawing Sheets ethylene glycol-poly(caprolactone)
$M_w$ 3000, domain size ~ 30 A

NANOPOROUS POLYMERS CROSSLINKED VIA CYCLIC STRUCTURES

This application claims the benefit of U.S. provisional application Ser. No. 60/128,533 filed on Apr. 9, 1999 incorporated herein by reference in its entirety.

FIELD OF THE INVENTION

The field of the invention is nanoporous materials.

BACKGROUND OF THE INVENTION

As the size of functional elements in integrated circuits decreases, complexity and interconnectivity increases. To accommodate the growing demand of interconnections in modern integrated circuits, on-chip interconnections have been developed, and such interconnections generally consist of multiple layers of metallic conductor lines embedded in a low dielectric constant material. The dielectric constant in such material has a relatively important influence on the performance of an integrated circuit. Materials having low dielectric constants (i.e., below 2.2) are desirable because they typically allow faster signal velocity and shorter cycle times. Moreover, lowering of the dielectric constant often reduces capacitive effects, leading frequently to reduced cross talk between conductor lines and lower voltages to drive integrated circuits.

One way of achieving low dielectric constants is to select materials with inherently low dielectric constants. Generally, two different classes of low dielectric constant materials have been employed in recent years—inorganic oxides and organic polymers. Inorganic oxides often have dielectric constants between 2.5 and 4, which tends to become problematic when device features are smaller than 1 µm. Organic polymers, including epoxy networks, cyanate ester resins and polyimides vary greatly in their usefulness as low dielectric material. Epoxy networks frequently show disadvantageously high dielectric constants at about 3.8–4.5. Cyanate ester resins have relatively low dielectric constants between approximately 2.5–3.7, but tend to be rather brittle, thereby limiting their utility. Polyimides have shown many advantageous properties including high thermal stability, ease of processing, low stress/thermal coefficient of expansion (TCE), low dielectric constant and high resistance. Polyimides are therefore frequently used as alternative low dielectric constant polymers.

With respect to other properties, desirable dielectrics should also be free from moisture and out-gassing problems, have suitable adhesive and gap-filling qualities, and have suitable dimensional stability towards thermal cycling, etching, and CMP processes (i.e., chemical mechanical polishing). Suitable dielectrics should also have Tg values (glass transition temperatures) of at least 300° C. and preferably 500° C. or more.

The demand for materials having a dielectric constant of lower than 2.2 has led to the development of dielectric materials with designed-in nanoporosity. Since air has a dielectric constant of about 1.0, it has become a major goal to reduce the dielectric constant of nanoporous materials down towards a theoretical limit of 1.

Several approaches are known in the art for fabricating nanoporous materials. In one approach, a thermostable polymer is blended with a thermolabile (thermally decomposable) polymer. The blended mixture is then crosslinked and the thermolabile portion thermolyzed, and examples for this approach are set forth in U.S. Pat. No. 5,776,990 to Hedrick et al. In another approach, thermolabile blocks and thermostable blocks alternate in a single block copolymer. The block copolymer is then heated to thermolyze the thermolabile blocks. In a third approach, thermostable blocks and thermostable blocks carrying thermolabile portions are mixed and polymerized to yield a copolymer. The copolymer is subsequently heated to thermolyze the thermolabile blocks. In yet a fourth approach, small hollow glass spheres are introduced into a material. Examples are given in U.S. Pat. No. 5,458,709 to Kamezaki and U.S. Pat. No. 5,593,526 to Yokouchi.

Regardless of the approach used to introduce the voids, structural problems are frequently encountered in fabricating nanoporous materials. Among other things, increasing the porosity beyond a critical extent (generally about 30% in the known nanoporous materials) tends to cause the porous materials to collapse. Collapse can be prevented to some degree by adding crosslinking additives that couple thermostable portions with other thermostable portions, thereby producing a more rigid network. U.S. Pat. No. 5,710,187 to Streckle, Jr., describes crosslinking for this purpose, crosslinking aromatic monomers using multifunctional acylor benzylic halides.

To achieve such a high degree of crosslinking, two different strategies are typically employed. In one strategy, a very high density of crosslinking functionalities is incorporated into the polymeric strands. A high density, however, may create several problems. First, more synthetic steps are usually needed to generate appropriate monomers or blockpolymers. Second, a very high density of crosslinking functionalities may unfavorably alter the chemical or physicochemical nature of the desired end product. Third, the balance of crosslinking between polymeric strands and crosslinking within a single polymeric strand is generally difficult to control. Moreover, in the process of crosslinking, the flexibility of the polymeric strands decreases. Decreased flexibility of polymeric strands may tend to makes subsequent reactions of unreacted crosslinking functionalities less likely, leading to an undesirably high number of excess reactive groups. Such excess reactive groups may then interfere with down-stream reactions. Another disadvantage of decreased flexibility of polymeric strands is that an even distribution of thermolabile portions may be constrained.

In the other strategy, a relatively large amount of exogenous crosslinking molecules is added to promote a high degree of crosslinking. Such amounts may create additional problems. One problem is that exogenous crosslinking molecules must generally be chemically compatible with the polymeric strands, i.e., they need to be soluble in the same solvent system, and they need to exhibit reactivities specific towards polymeric strands. The addition of exogenous crosslinking molecules generally does not afford control over crosslinking between polymeric strands and crosslinking within a single polymeric strand. Furthermore, in the process of crosslinking, the flexibility of the polymeric strands decreases. Decreased flexibility of polymeric strands, in turn, promotes steric hindrance and makes subsequent crosslinking reactions less likely. Therefore, the addition of exogenous crosslinking molecules has inherently limited efficiency. Still further, unreacted excess crosslinking molecules may not be easily removable from the crosslinked material, and may adversely influence the physicochemical properties of the end product, or may interfere with downstream reactions.

Even if crosslinking is successfully performed to a high degree, many crosslinkers known in the art suffer from a common further disadvantage. In general, crosslinkers comprise at least one sigma bond, allowing an extra degree of flexibility—typically rotational freedom along the bond axis. This contributes, despite a covalent connection, to a somewhat reduced degree of rigidity.

In summary, various methods are known to crosslink polymers in nanoporous materials. However, current methods often tend to have inherently limited efficiency, or still allow undesirable flexibility in the crosslinked polymeric strands. Surprisingly, despite great efforts to improve crosslinking in nanoporous materials, there is no method that permits crosslinking with very high efficiency, without adding at least some degree of flexibility in the crosslinked polymeric strands. Therefore, there is still a need for methods and compositions that circumvent these limitations.

SUMMARY OF THE INVENTION

In accordance with the present invention, compositions and methods are provided in which nanoporous polymeric materials include polymeric strands having backbones that are crosslinked using cyclic structures.

In one aspect of the inventive subject matter, at least some of the cyclic structures involving in crosslinking are formed de novo during crosslinking. In another aspect, at least some of such cyclic structures are included in the backbones of the polymeric strands. At least one of the cyclic structures may advantageously comprise an aromatic structure, and more advantageously comprise a benzyl moiety.

In another aspect of the inventive subject matter, especially preferred polymers comprise a poly(arylene ether) synthesized from a difluoroaromatic portion and an aromatic bisphenolic portion. In another preferred aspect the difluoroaromatic portions of the poly(arylene ether) carry at least two different crosslinking functionalities, and in an even more preferred aspect, the crosslinking functionalities comprise an ethynyl and a tetracyclone. Nanoporosity is preferably introduced by thermolyzing one or more thermolabile portions in the crosslinked polymer. An especially preferred thermolabile portion comprises ethylene glycol-poly(caprolactone).

Various objects, features, aspects and advantages of the present invention will become more apparent from the following detailed description of preferred embodiments of the invention, along with the accompanying drawing.

DETAILED DESCRIPTION

In nanoporous polymers having pores formed from thermolyzing thermolabile groups, it is known for cyclic structures to form part of the backbone, to support crosslinking functionalities $X_1$ and $X_2$, and to be included in termini and side chains. However, the present inventors are not aware of such polymers in which the crosslinking operation creates de novo cyclic structures that form part of the crosslink.

Figure 1:
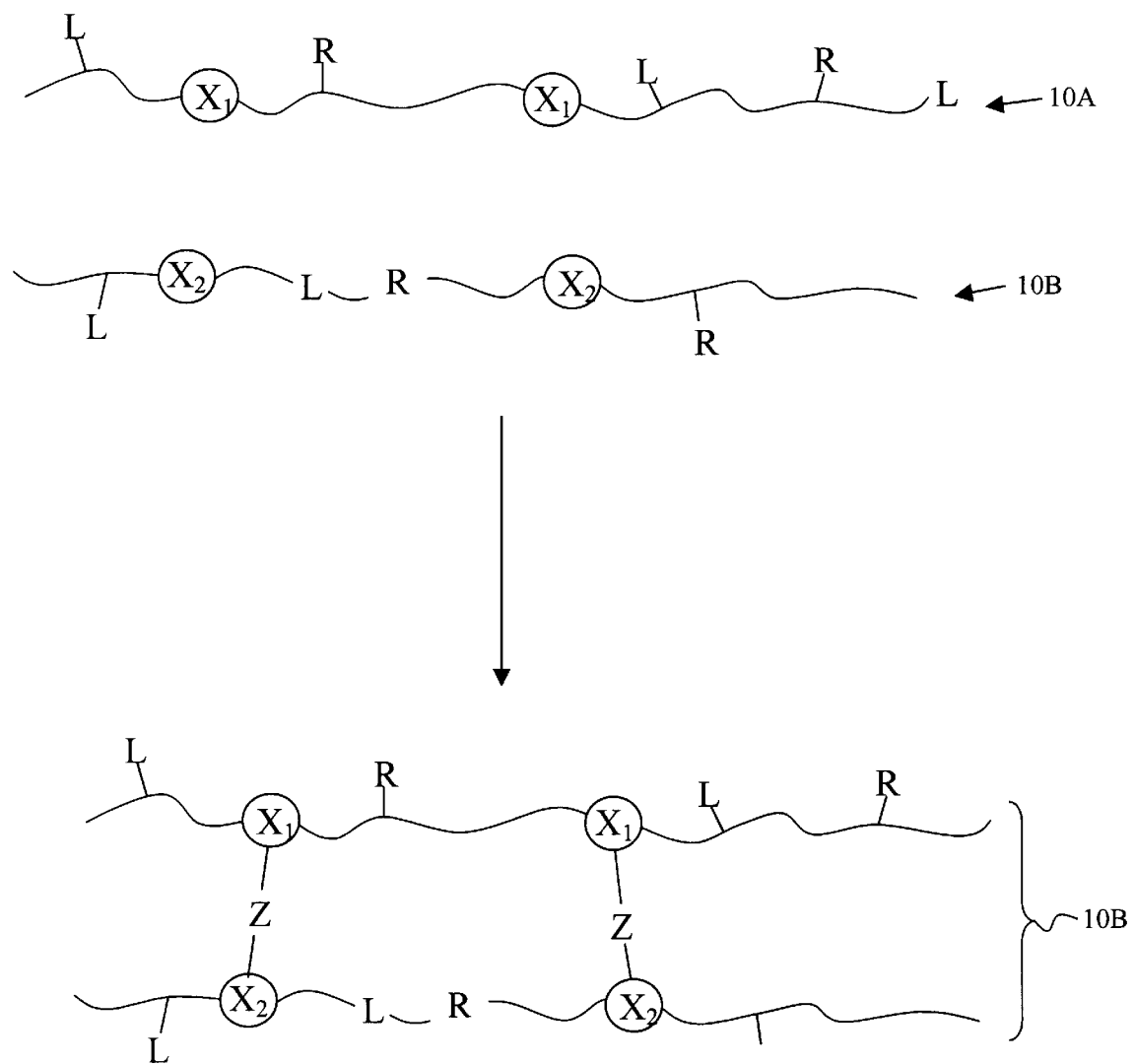
FIG. 1 is a prior art scheme depicting crosslinking of polymeric strands containing thermolabile groups.

Thus, in prior art FIG. 1, polymeric strands 10A, 10B have thermolabile portions L, cyclic structures R, and crosslinking functionalities $X_1$ and $X_2$. During a crosslinking reaction strands 10A and 10B are crosslinked to form crosslinks Z, thereby covalently connecting the polymeric strands in a crosslinked polymer 10C.

Figure 2:
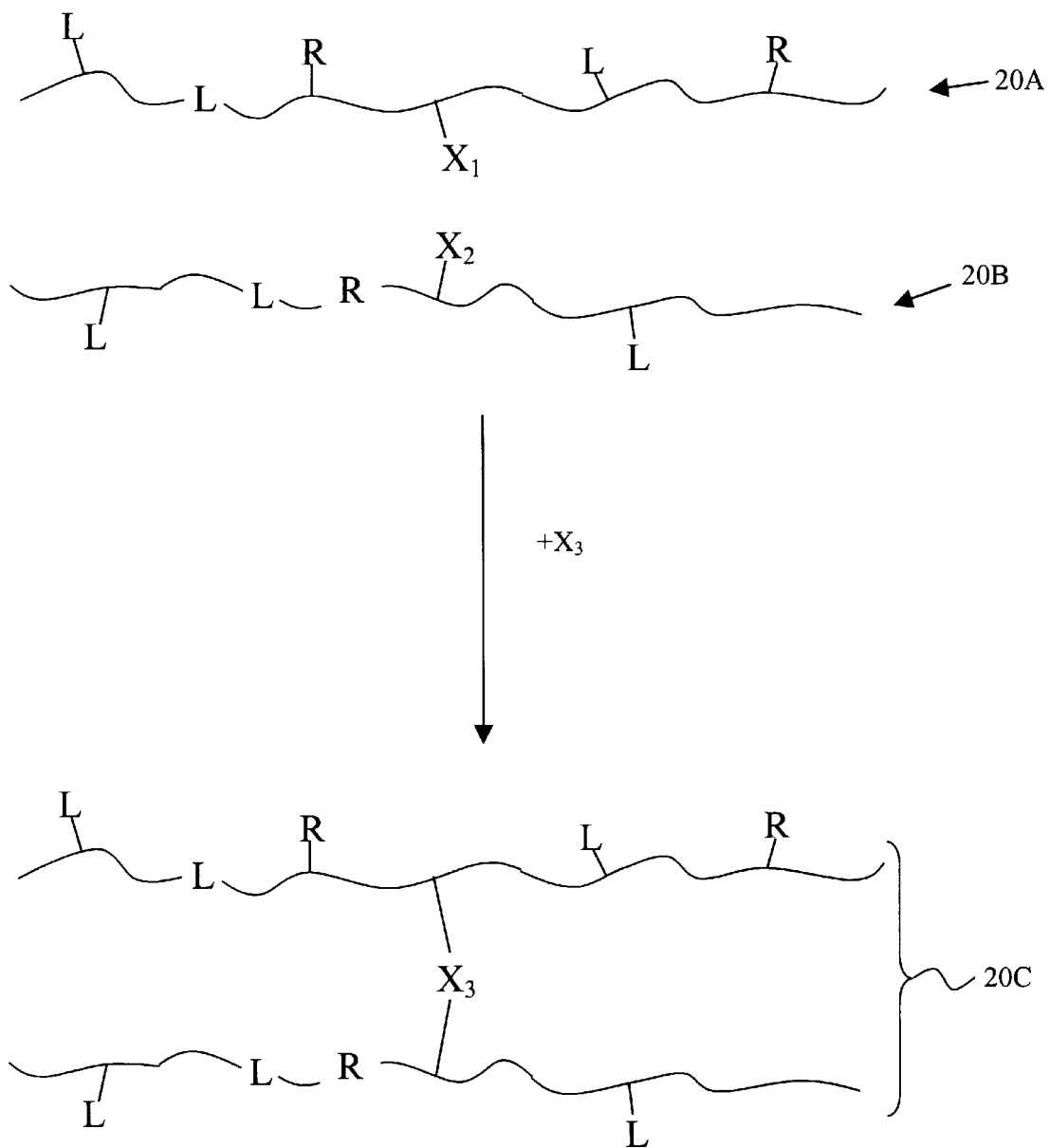
FIG. 2 is a prior art scheme depicting crosslinking of polymeric strands containing thermolabile groups in which an exogenous crosslinker includes a cyclic structure.

Similarly, in prior art FIG. 2, polymeric strands 20A, 20B include a plurality of thermolabile portions L, as well as cyclic structures R. During crosslinking some of the crosslinking functionalities $X_1$ and $X_2$ react with a cyclic structure containing crosslinker $X_3$ such that $X_3$ is used to crosslink strands 20A, 20B, to form a crosslinked polymer 20C.

Figure 3:
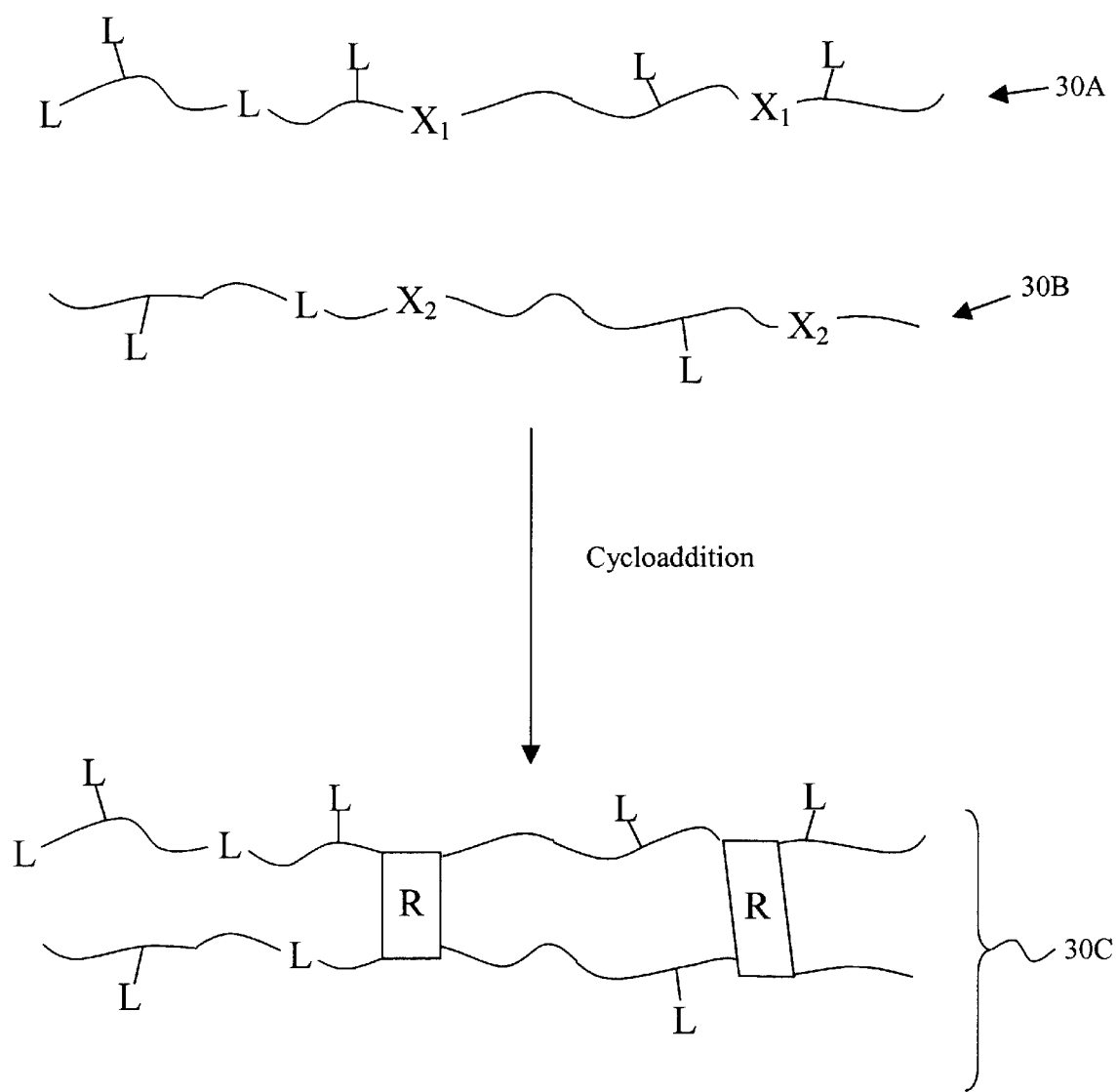
FIG. 3 is a scheme depicting crosslinking of polymeric strands containing thermolabile groups in which a cyclic structure is formed de novo during the process of crosslinking.

In FIG. 3, polymeric strands 30A, 30B include a plurality of thermolabile portions L, as well as various crosslinking functionalities $X_1$, $X_2$. During crosslinking some of the crosslinking functionalities $X_1$ react together with some of the crosslinking functionalities $X_2$ in a cycloaddition reaction to form de novo a cyclic structure R that directly binds strands 30A, 30B together into a crosslinked polymer 30C.

Figure 4:
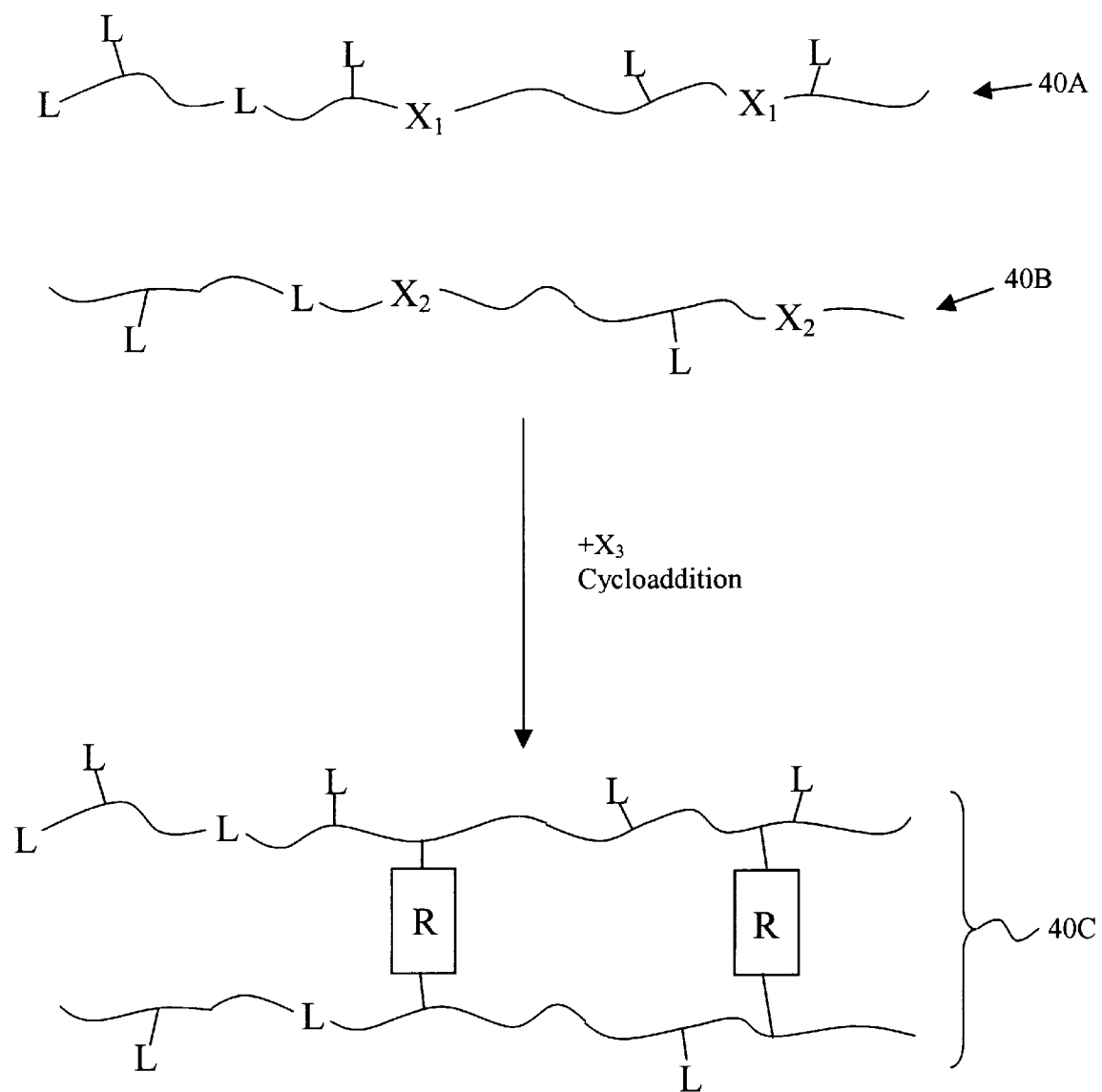
FIG. 4 is a scheme depicting crosslinking of polymeric strands containing thermolabile groups in which an exogenous crosslinker is added, and a cyclic structure is formed de novo during the process of crosslinking.

In FIG. 4, polymeric strands 40A, 40B include a plurality of thermolabile portions L, as well as various crosslinking functionalities $X_1$, $X_2$. During crosslinking some of the crosslinking functionalities $X_1$ and $X_2$ react with a crosslinker $X_3$ in a cycloaddition reaction to form de novo a cyclic structure R, that then becomes part of the crosslink forming crosslinked polymer 40C.

As described in greater detail below, thermolabile portions L may be positioned at various sites in the polymeric strands, including the termini, backbone and side chains, and may comprise an aliphatic compound, including polyesters, such as ethylene glycol-poly(caprolactone), polylactides, and polylactate. The polymeric strands may comprise a block copolymer, for example, a polyester, polyether, polyamide, and a polyimide. The cyclic structure in the crosslinking molecule $X_3$ may comprise a mono- or polycyclic structure, a conjugated double bond or an aromatic system. The crosslinking functionalities $X_1$ and $X_2$ may comprise a π-bond, and may comprise a diene and a dienophile, for example a tetracyclone and a tolane.

Moreover, the schemes set forth in FIGS. 3 and 4 are intended to be viewed in a generalized manner. As used herein, for example, the term "polymeric strand" refers to any composition of monomers covalently bound to define a backbone, and includes any pendant groups other than those coupled via crosslinking.

The term "monomer" as used herein refers to any chemical compound that is capable of forming a covalent bond with itself or a chemically different compound in a repetitive manner. The repetitive bond formation between monomers may lead to linear, branched, super-branched or three-dimensional products. Furthermore, monomers may themselves comprise repetitive building blocks, and when polymerized the polymers formed from such monomers are then termed "blockpolymers". Monomers may belong to various chemical classes of molecules including organic, organometallic or inorganic molecules. Examples of organic monomers are acrylamide, vinylchloride, fluorene bisphenol or 3,3'-dihydroxytolane. Examples of organometallic monomers are octamethylcyclotetra-siloxane, methylphenylcyclotetrasiloxane, etc. Examples of inorganic monomers include $SiO_2$ or $Al_2O_3$. The molecular weight of monomers may vary greatly between about 40 Dalton and 20000 Dalton. However, especially when monomers comprise repetitive building blocks, monomers may have even higher molecular weights. Monomers may also include thermolabile groups, reactive groups, or functionalities for crosslinking. For example, monomers may comprise poly(propylene oxide), polycarbonates, poly(methylmethacrylate), various styrenic polymers, carboxylate groups, activated ester groups, or ethynyl- or tetracyclone groups.

Under these definitions, polymeric strands may thus be linear, branched, super-branched, or three-dimensional, and may include thermolabile portions and crosslinking functionalities. Polymeric strands may belong to any chemical class, including organic, organometallic or inorganic compositions. Examples of organic polymeric strands are polyimides, polyesters, or polybenzils. Examples of organometallic polymeric strands are various substituted polysiloxanes. Examples of inorganic polymeric strands include silica or alumina. Polymeric strands may also comprise a wide range of functional or structural moieties, including aromatic systems, and halogenated (e.g., fluorinated) groups. The molecular weight of contemplated polymeric strands span a wide range, typically between 400 Dalton and 400000 Dalton or more.

Especially preferred polymeric strands are those having backbone crosslinking groups comprising a diene and a dienophile. A particularly preferred class comprises strands in which the diene is a cyclopentadieneone. Such strands can advantageously comprise polybenzils, and can be prepared from a difluoroaromatic compound and an aromatic bisphenolic compound. In more preferred embodiments the aromatic bisphenolic compound comprises a fluorene bisphenol or a 3,3'-dihydroxytolane, and the difluoroaromatic compound comprises a difluorobenzil. In even more preferred embodiments, the difluoroaromatic compound comprises a tetracyclone.

Other preferred embodiments may be characterized by a modification of the aromatic portion of the aromatic bisphenolic compound, or modification of the aromatic portion of the difluoroaromatic compound. Such modifications may include isomeric variations, or addition or removal of aromatic groups. For example, a tetracyclone, halogens, and particularly fluorine, amides, alcohols, aliphatic or aromatic substituents may be introduced into an aromatic portion of a 3,3'-dihydroxytolane. Analogous changes are also contemplated for the aromatic portion of a 4,4'-difluorobenzil. In yet another class of variations, an $sp^2$-hybridized carbon atom may be replaced by any other appropriate atom, including sulfur, oxygen, nitrogen, etc.

In further alternative embodiments, the polymeric strands may be completely different from a polybenzil. Alternative polymeric strands include organic, organometallic or inorganic polymers. Examples of contemplated organic polymers are polyimides, polyesters and polycyanurates. Examples of contemplated organometallic polymers are poly(dimethylsiloxane) and poly-(vinylsiloxane). Examples of contemplated inorganic polymers are derivatized and underivatized silica and alumina. Indeed, contemplated polymeric strands need not comprise a single type of polymeric strands, but may comprise a mixture of various non-identical polymeric strands. It should be further appreciated that, especially where polymeric strands are relatively short (e.g., MW of less than about 4000 Dalton, polymeric strands (e.g., the first and the second polymeric strand) may be covalently coupled to each other.

As used herein, the term "backbone" refers to a contiguous chain of atoms or moieties forming a polymeric strand, wherein the atoms or moieties are covalently bound such that removal of any of the atoms or moiety would result in interruption of the chain. Preferred backbones comprise an aromatic ring system, or at least a conjugated group. There are, however, many other combinations contemplated. For example, contemplated backbones may include any elements, including especially C, N, O, S, P, Si, and Al. Contemplated moieties include aromatic groups including phenyl-, substituted or unsubstituted cyclopentadienyl groups, thermolabile groups, aromatic ring systems, and fluorinated or other reactive groups.

Crosslinking is typically mediated by various crosslinking functionalities and may occur by numerous mechanisms. If a covalent bond is formed between two crosslinking functionalities, it may be formed by a variety of chemical reaction mechanisms, including additions, eliminations or substitutions. Examples are nucleophilic or electrophilic addition, E1- or E2-type eliminations, nucleophilic and aromatic substitutions. Furthermore, crosslinking may be a spontaneous process or may require energy or a catalyst. Examples of such energy are thermal energy, radiation, mechanic, electric or electromagnetic energy. Examples of catalysts are acids, bases, and palladium-coated activated charcoal. In yet further alternative embodiments, crosslinking may or may not involve extrinsic crosslinkers, and any extrinsic crosslinker may comprise single molecules, crosslinking molecules may also themselves be oligomeric or even polymeric.

It is also contemplated that the number of crosslinking functionalities in a strand that are used for crosslinking may vary widely. This would typically depend on the strength of crosslinking required, as well the strength of the individual crosslinking links. For example, to form a stable crosslink at room temperature between two single strands of nucleic acids, a minimum of about 25–30 hydrogen bonds is required. In contrast, only one covalent bond is needed to achieve a crosslink with even higher stability. It is also contemplated that the number of crosslinking functionalities participating in crosslinking may vary within a wide range. For example, crosslinking may involve as little as 5% of crosslinking functionalities, but may also involve more than 90% of all available crosslinking functionalities in the polymeric strands.

The term "crosslinking functionality" as used herein refers to any elements or combinations of elements having sufficient reactivity to be used in crosslinking. It is generally contemplated that appropriate crosslinking functionalities are covalently coupled to at least one polymeric strand, and it is especially contemplated that at least some of the crosslinking functionalities must form part of the backbone, and in more preferred aspects of the inventive subject matter, contemplated crosslinking functionalities comprise a π-bond. With respect to the position of a crosslinking functionality within a polymeric strand, it is contemplated that crosslinking functionalities can be positioned in any part of a polymeric strand, a backbone, and the termini of the backbone or polymeric strand. It should further be appreciated that crosslinking functionalities employed in crosslinking polymeric strands may or may not be identical. For example, in preferred embodiments, one crosslinking functionality of a first polymeric strand comprises a diene (preferably a tetracyclone), and another crosslinking functionality of a second polymeric strand comprises a dienophile (preferably an ethynyl group), which will form upon cycloaddition reaction a sexiphenylene structure.

It is also contemplated that while preferably both polymeric strands comprise crosslinking functionalities within their backbones, some polymeric strands may not have crosslinking functionalities disposed within their backbone. Nevertheless it is contemplated that crosslinking between strands having crosslinking functionalities within their backbones and strands having crosslinking functionalities not within their backbones can be achieved by reacting crosslinking functionalities disposed within a backbone with reactive groups in a polymeric strand, so long as a cyclic structure is formed. Having both the first and second crosslinking functionalities on a single polymeric strand is especially advantageous. For example, a single type of polymer may contain two types of crosslinking functionalities that may form a crosslink with a cyclic structure. In another example, a semi-interpenetrating polymer network can be formed. A semi-interpenetrating polymer network may thus comprise a plurality of polymeric strands crosslinked by cyclic structures, and other polymeric strands, which may or may not be crosslinked through a formation of the cyclic structure. Alternatively, it is contemplated that crosslinking functionalities on polymeric strands may react with exogenously added crosslinking molecules so long as a cyclic structure is formed. For example, polymeric strands may comprise dienophiles within their backbones, and dienes are added as exogenous crosslinker.

The term "thermostable" as used herein refers to the tendency of a material to resist elevated temperatures, typically in the range of 250° C. to 450° C. In a preferred embodiment, the thermostable portion of the polymer comprises an aromatic portion such as a polybenzil. In a more preferred embodiment, the polybenzil is prepared from a difluoroaromatic compound and an aromatic bisphenolic compound, and in an even more preferred embodiment, the aromatic bisphenolic compound comprises a fluorene bisphenol or 3,3'-dihydroxytolane, and the difluoroaromatic compound comprises a difluorobenzil. In further preferred embodiments, the difluoroaromatic compound comprises a tetracyclone.

The term "thermolabile" as used herein refers to the property of a material to degrade above an elevated temperature, typically in the range of 250° C. to 450° C. It should be understood that the thermolabile groups of FIGS. 3 and 4 may be positioned in any part of the backbones, including the termini. Preferred thermolabile groups include an aliphatic compound, and are more preferably polypropyleneoxide, polylactides, polylactate, polycarbonates or polymethylmethacrylate. In a preferred embodiment, the thermolabile portion is attached to a polybenzil polymer within a difluoroaromatic portion in the polymeric chain, and comprises an ethylene glycol-poly(caprolactone). In more preferred embodiments, 5%–35% of the difluoroaromatic portion carries an ethylene glycol-poly(caprolactone) with an average molecular weight of 3000 Dalton.

Thermolabile groups L may advantageously include a connector moiety. The term "connector moiety", however, should be interpreted broadly herein to mean any kind of chemical moiety that is capable of reacting with a reactive group in a polymer. Many types of reactions, including substitutions, eliminations and additions, may be involved to form a covalent bond. Examples are esterification, amidation, epoxidation, etc. The size of the connector moiety may vary considerably from molecular weights of about 20 Dalton to about and above 500 Dalton. Examples of relatively small connector moieties are acidic groups, basic groups, nucleophilic groups and electrophilic groups. Alternative small connector moieties are, for example, R—$CO_2$H, R—CO—R', R—$NH_2$, R—SH, R—Halogen and so on. Examples of larger connector moieties are tetracyclones, cyclopentadiene groups or bifunctional aliphatic groups, including especially 1,2-diaminobenzenes or 1,3-diphenylpropan-2-ones. It is still further contemplated that alternative connector moieties need not have a single type of functional group or single type of substituent, but alternative connector moieties may also be a mixture of various non-identical connector moieties.

It is further contemplated that alternative connector moieties need not engage in formation of a covalent bond. Appropriate alternative connectors may also engage in non-covalent coupling including hydrophobic-, electrostatic-ionic interactions, complex formation or hydrogen bonding. Examples are leucine zipper-like structures, highly polar groups, polycationic groups or polyanionic groups, and polydentate-type groups. Chemical bonds between a connector moiety and a polymeric strand may be formed at various positions in the polymeric strand, including positions at the ends of the intermediate. Connector moieties may also be located in any part of the thermolabile group including the termini.

The term "degrade" as used herein refers to the breaking of covalent bonds. Such breaking of bonds may occur in many ways, including heterolytic, radical, and homolytic breakage. The breaking of bonds need not be complete, i.e. not all breakable bonds must be cleaved. Furthermore, the breaking of bonds may occur in some bonds faster than in others. Ester bonds, for example, are generally less stable than amid bonds, and are therefore cleaved at a faster rate. Breakage of bonds may also result in the release of fragments differing from one another, depending on the chemical composition of the degraded portion. The energy involved in thermolysis may comprise thermal, electromagnetic, and mechanical energy, or particulate and non-particulate radiation. For example, an appropriate energy could be alpha-radiation, sonication, microwaves or heating.

It is contemplated therefore that methods disclosed herein can advantageously be employed in the fabrication of numerous nanoporous materials—the general process including the steps of: providing a first polymeric strand and a second polymeric strand, wherein both the first polymeric strand and the second polymeric strand comprise a crosslinking functionality and a thermostable portion, and wherein at least one of the first polymeric strand and the second polymeric strand further comprise a thermolabile portion; crosslinking the first and second polymeric strands by reacting the crosslinking functionality of the first polymeric strand with the crosslinking functionality of the second polymeric strand, thereby forming a cyclic structure; and providing an energy to at least partially degrade the thermolabile portion.

By varying the polymeric strands employed in the process, a great variety of nanoporous materials can be fabricated. As used herein the term "nanoporous material" refers to any material that includes a significant number of voids with diameters in a range of about 1 nm to about 1000 nm. Contemplated compositions for nanoporous materials include synthetic polymers, inorganic material, and organometallic compounds. Examples of synthetic polymers are polyethers, polyimides or polyesters. Examples of inorganic material include silica or aluminosilicates as well as ceramic materials. Examples of organometallic compounds include poly(dimethylsiloxane), poly-(vinylsiloxane) and poly (trifluoropropylsiloxane).

Nanoporous materials may also be characterized by the extent to which mass is replaced with a gas. The composition of the gas is generally not critical, and appropriate gases include relatively pure gases and mixtures thereof. Air (which is predominantly a mixture of $N_2$ and $O_2$) is commonly disposed in the "voids" of nanoporous materials, but pure gases such as nitrogen, helium, argon, $CO_2$ or CO are also contemplated. Nanoporous materials may further be characterized by the structure of the voids. Nanoporous materials typically include spherical voids, but may alternatively or additionally include tubular, lamellar, discoidal, and voids having other shapes. Moreover, some of the voids in nanoporous material may be substantially larger or smaller than about 1 $\mu$m. Nanoporous materials may have many different forms, including but not limited to thin films, plates, spheres, blocks or cylinders. Nanoporous materials may also comprise additional materials, including fillers, surfactants and plasticizers.

The nanoporous polymers described herein are similar in some respects to those described in U.S. Pat. No. 5,874,516 to Burgoyne et al. (Feb. 1999), incorporated herein by reference, and may be used in substantially the same manner as set forth in that patent. For example, it is contemplated that nanoporous polymers described herein may be employed in fabricating multichip modules, interlayer dielectrics, protective coatings, and as a substrate in circuit boards or printed wiring boards. Moreover, films or coatings of the nanoporous polymers described herein can be formed by solution techniques such as spraying, spin coating or casting, with spin coating being preferred. Preferred solvents are 2-ethoxyethyl ether, cyclohexanone, cyclopentanone, toluene, xylene, chlorobenzene, N-methyl pyrrolidinone, N,N-dimethylformamide, N,N-dimethylacetamide, methyl isobutyl ketone, 2-methoxyethyl ether, 5-methyl-2-hexanone, Y-butyrolactone, and mixtures thereof. Typically, the coating thickness is between about 0.1 to about 15 microns. As a dielectric interlayer, the film thickness is less than 2 microns. Additives can also be used to enhance or impart particular target properties, as is conventionally known in the polymer art, including stabilizers, flame retardants, pigments, plasticizers, surfactants, and the like. Compatible or non-compatible polymers can be blended in to give a desired property. Adhesion promoters can also be used. Such promoters are typified by hexamethyidisilazane, which can be used to interact with available hydroxyl functionality that may be present on a surface, such as silicon dioxide, that was exposed to moisture or humidity. Polymers for microelectronic applications desirably contain low levels (generally less than 1 ppm, preferably less than 10 ppb) of ionic impurities, particularly for dielectric interlayers.

Figure 13:
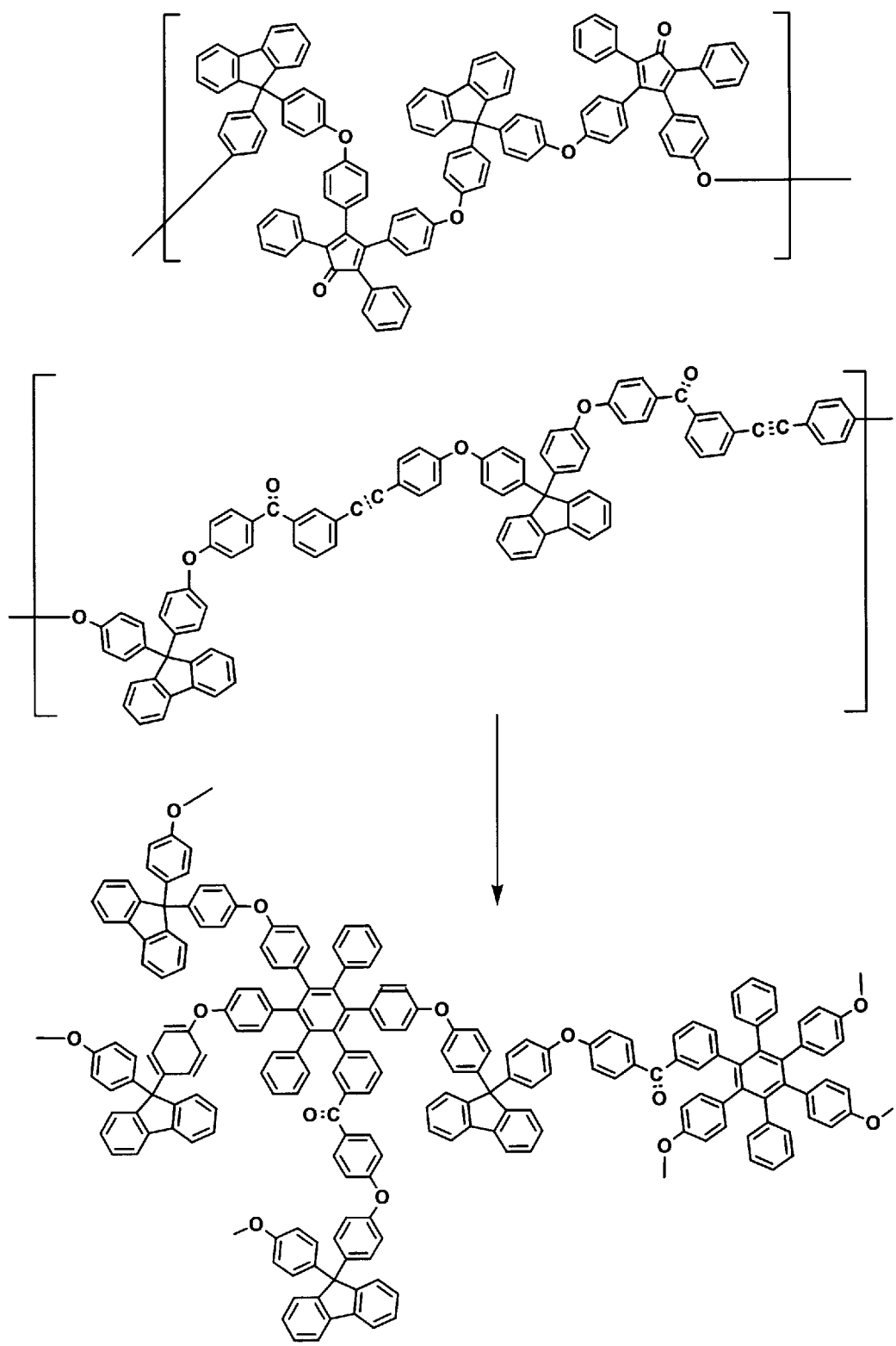
FIG. 13 is an exemplary crosslinking reaction according to the inventive subject matter.

With respect to the step of crosslinking the polymeric strands, the cyclic structure formed is preferably a monocyclic structure, more preferably a six-membered ring, and is produced via a Diels-Alder reaction including a tetracyclone containing polymeric strand and an ethynyl containing polymeric strand as reactants. In more preferred embodiments, crosslinking is performed via a heating step to a temperature of about 150° C. to 250° C. for approximately 60 min. An exemplary crosslinking reaction between two polymeric strands having crosslinking functionalities and thermolabile groups (not shown) is depicted in FIG. 13. While one polymeric strand has a cyclopentadienone as a crosslinking functionality, the other polymeric strand has a ethynyl group as a crosslinking functionality. The de novo formed cyclic structure is a phenyl ring in the center of hexaphenylbenzene (sexiphenylene) in the crosslinked polymeric strands. It should be especially appreciated that a de novo formation of ring structures during crosslinking introduces sterically constrained elements, thereby increasing rigidity of the crosslinked structure. Moreover, where multiple ring systems of one polymeric strand are covalently coupled to multiple ring systems of another polymeric strand, space filling structures are generated that help reduce the dielectric constant of the crosslinked polymeric strands.

It is also contemplated that the crosslinking reaction may be performed using a different energy source than heating, including light, radiation and electromagnetic energy. For example, alternative energies may be infrared laser light, $\alpha$-particle radiation, electron beams and microwaves. Where a heating step is used, a wide range of temperatures are contemplated, and it is particularly preferred that the temperature for the crosslinking reaction $T_{XL}$ is lower than the temperature for thermolysis of the thermolabile portion $T_D$. For example, $T_{XL}$ may be as low as about room temperature and as high as approximately 300° C. Furthermore, it is contemplated that the time required for the crosslinking reaction may vary considerably depending on the chemistry involved, from a few seconds or less to several hours or more.

In alternative embodiments, the cyclic structure need not be a phenyl ring, but may also comprise 4-, 5, or 7-membered rings, which preferably comprises a conjugated double bond and more preferably an aromatic system. Furthermore, the cyclic structure need not be limited to a single ring, but may instead include a polycyclic structure, e.g., two or more connected rings in a two- or three-dimensional system. Examples of two-dimensional connected ring systems are pyrene, phenanthrene, anthracene, etc. Examples of three dimensional ring systems are fullerenes and carboranes. Alternative ring systems may furthermore be saturated, comprise double bonds, or even be aromatic. Contemplated saturated ring systems include cyclobutyl rings, cycloheptyl rings and cyclooctyl rings. Examples of ring systems comprising double bonds are cyclopentadienyl rings, cyclohexadienyl rings and cyclooctatrienyl rings. Contemplated aromatic ring systems include benzenoid rings or naphthalene rings.

In further alternative embodiments, the formation of the cyclic structure may occur via reaction mechanisms other than a Diels-Alder reaction, including additions, substitutions and eliminations, and contemplated addition reactions include nucleophilic and aromatic additions. While contemplated substitution reactions include nucleophilic or electrophilic substitutions, contemplated elimination reactions include E1- or E2-type eliminations.

With respect to degrading the thermolabile portion, the energy employed is preferably thermal energy. In particular embodiments, for example, the crosslinked polymer is heated to about 350° C. for approximately 20 min. In alternative embodiments the temperature may vary considerably, depending on the nature of the thermolabile and thermostable portion of the crosslinked polymeric chains. Contemplated temperatures range from 200° C. or less, to about 350° C., 450° C., or even more. In further alternative embodiments, the time required to degrade at least part of the thermolabile portion may also vary greatly between a few seconds or less to several hours or more.

In yet further alternative embodiments, the energy may be a different form of energy than thermal energy. Such alternative energies include various electromagnetic radiations (e.g., are UV-, laser-, X-rays or infrared irradiation), mechanical energy (e.g. sonication or physical pressure), and particle radiation (e.g., alpha- or beta-radiation).

EXAMPLES

Figure 5:
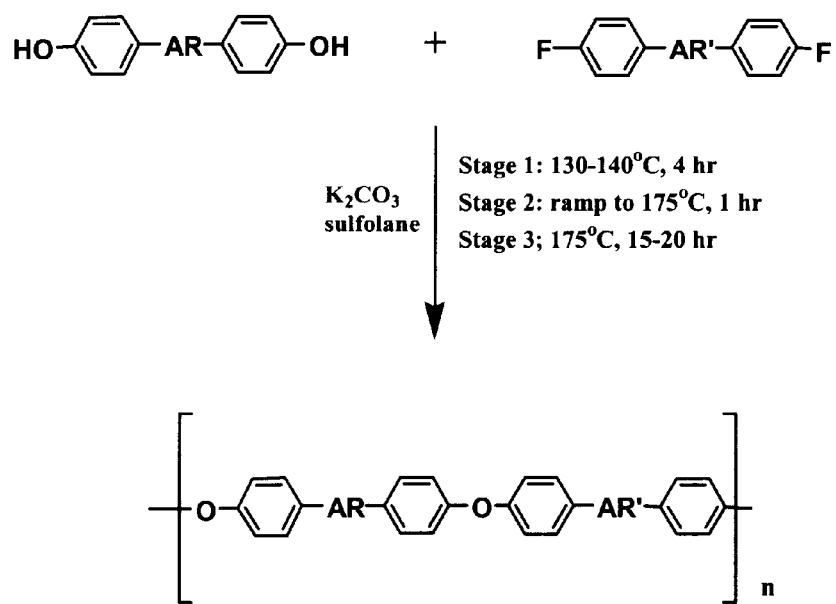
FIG. 5 is a general synthetic scheme for producing a poly(arylene ether).

The following examples demonstrate the principles of the inventive subject matter. In FIG. 5, a general synthetic scheme is shown for fabricating poly(arylene ether) polymeric strands that may include crosslinking functionalities, thermolabile and thermostable portions. AR and AR' can independently comprise any suitable aromatic or non-aromatic portion, although in these examples HO—$C_6H_4$—AR—$C_6H_4$—OH is preferably fluorene bisphenol, and F—$C_6H_4$—AR'—$C_6H_4$—F is preferably a difluoroaromatic compound containing at least one tolane moiety.

A general synthetic procedure for the nucleophilic aromatic substitution reaction as exemplified by a reaction between fluorene bisphenol and 4-fluoro-3'-(4-fluorobenzoyl)tolane is as follows: 1 L 3-neck RB flask, equipped with an magnetic stirrer, a thermocouple, a Dean-Stark trap, a reflux condenser and $N_2$ inlet-outlet connection was purged by $N_2$ for several hours and fed with 0.2 L warm sulfolane. At 70–80° C., 35.042 g (0.1000 Mol) of fluorene bisphenol (FBP), 31.8320 g (0.1000 Mol) of 4-fluoro-3'-(4-fluorobenzoyl)-tolane (FBZT) and 27.64 g (0.2 Mol) of Potassium carbonate were added and rinsed by 165 mL of warm sulfolane and 165 mL of toluene. The reaction mass was heated to 140° C. and azeotroped at this temperature for 1–2 hours, then temperature was gradually raised to 175° C. by removing of toluene and reaction was continued at 175o with azeotroping during 15–20 h. The temperature was reduced to 165° C., 4-fluorobenzophenone was added and end-capping was continued for 5 hours. The reaction mass was diluted with 165 mL of NMP and left for overnight. Then cold reaction mass was filtered through paper filter, precipitated in 5× MeOH (0.03% HNO3), redissolved in NMP and reprecipitated in 5× MeOH (0.01% $HNO_3$). The precipitate was filtered using paper filter, washed on filter 3 times each with 1 L of MeOH and dried in vacuum oven for overnight at 60°–70° C.

Example 1

Figure 6A:
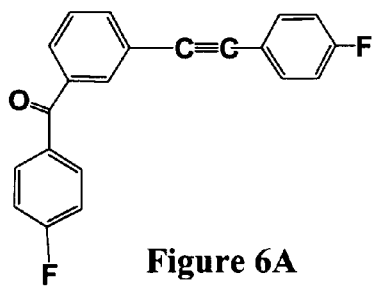
FIGS. 6A–6J are structures of contemplated difluoroaromatic compounds.
Figure 6B:
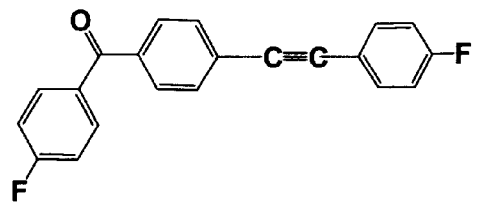
Figure 6C:
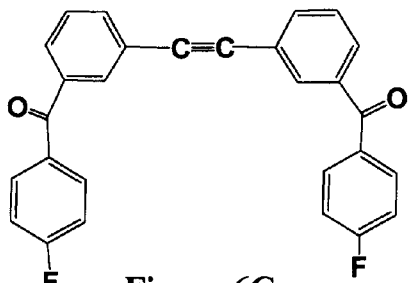
Figure 6D:
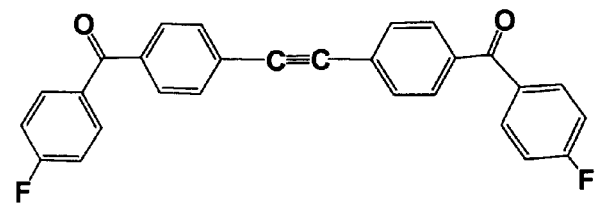
Figure 6E:
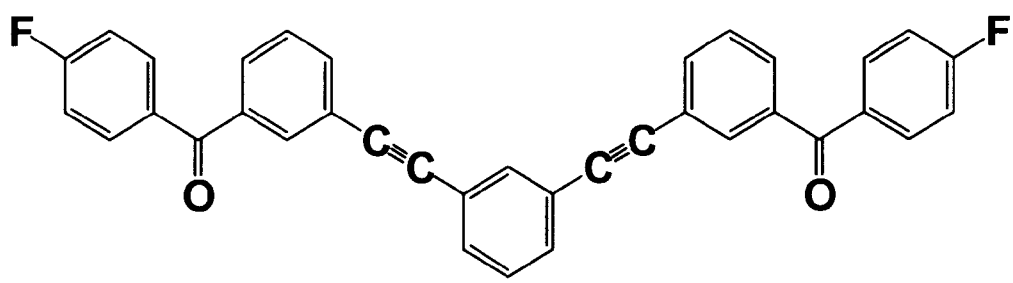
Figure 6F:
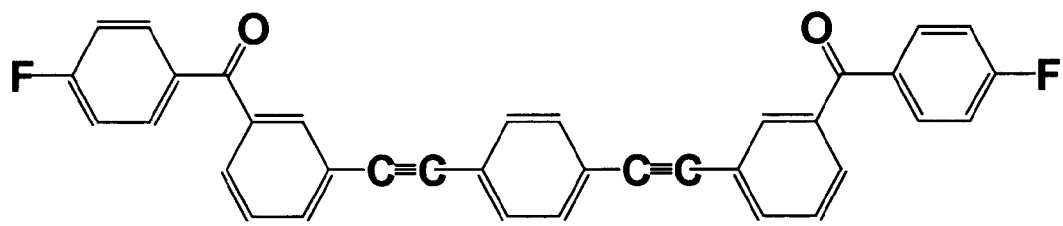
Figure 6G:
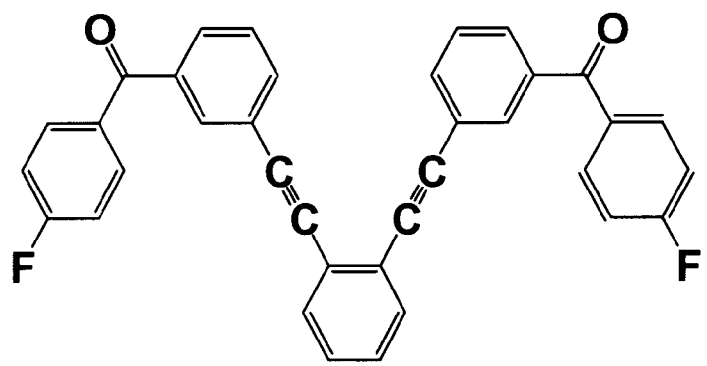
Figure 6H:
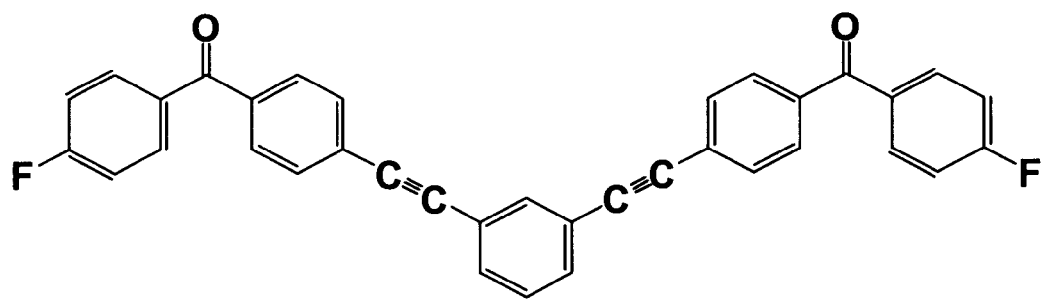
Figure 6I:
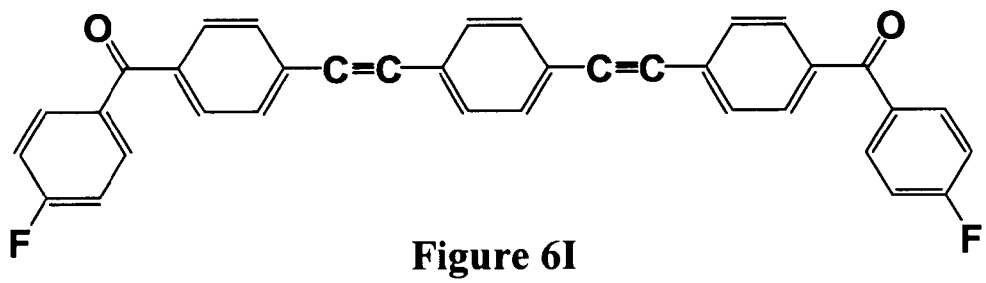
Figure 6J:
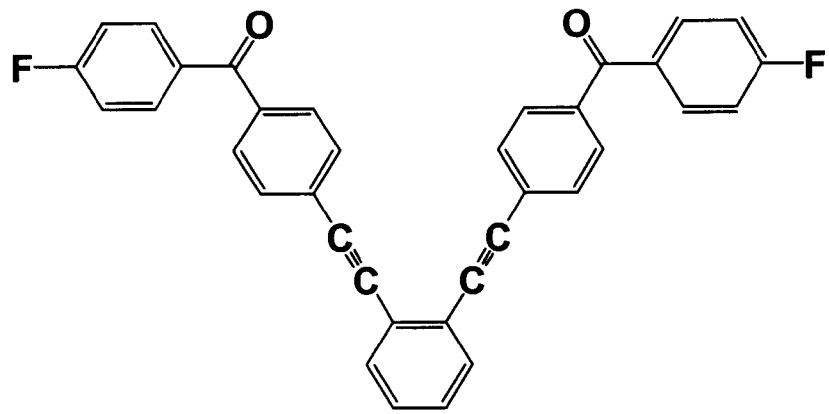

FIGS. 6A–6J depict exemplary structures of alternative difluoroaromatic compounds (carrying at least one dienophile) that can be employed in the synthesis of polymeric strands. These novel compositions are particularly advantageous in having flexible structural moieties built into the uncured poly(arylene ethers), thereby maintaining the polymers' flexibility, low melt viscosities, and high solubilities in common solvents, such as cyclohexanone and benign aromatic ethers such as anisole and phenetole, to facilitate solution formulation and spin-coating. A homogeneous physical blend of any of these compounds with a fluorene bisphenol can be spun onto the surface of a silicon wafer or other target surface, and then thermally activated to undergo a polymerizing and crosslinking reaction, thereby forming a thermally stable network at a temperature lower than 300° C. If thermolabile groups are grafted on (e.g., as set forth in FIG. 8), and the resulting polymer is heated further, the thermolabile groups decompose, volatilize and generate voids in the network. The resulting network possesses high glass-transition temperature in excess of 400° C. by virtue of the crosslinking reaction and its high-temperature polymer structural characteristics. A general synthetic scheme for the structures depicted in FIGS. 6A and 6B is as follows:

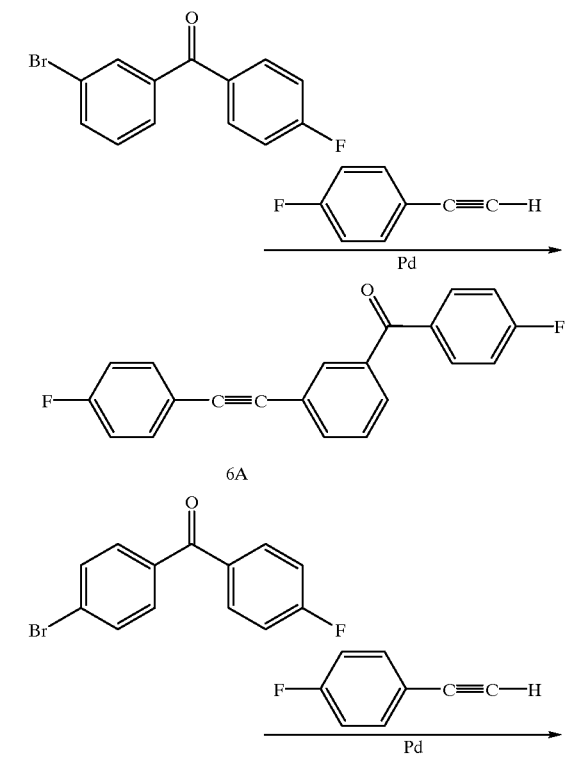

6A

-continued
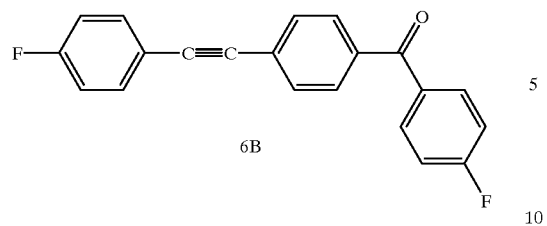
6B
A general synthetic scheme for the structures depicted in FIGS. 6C, 6E, 6F and 6G is as follows:
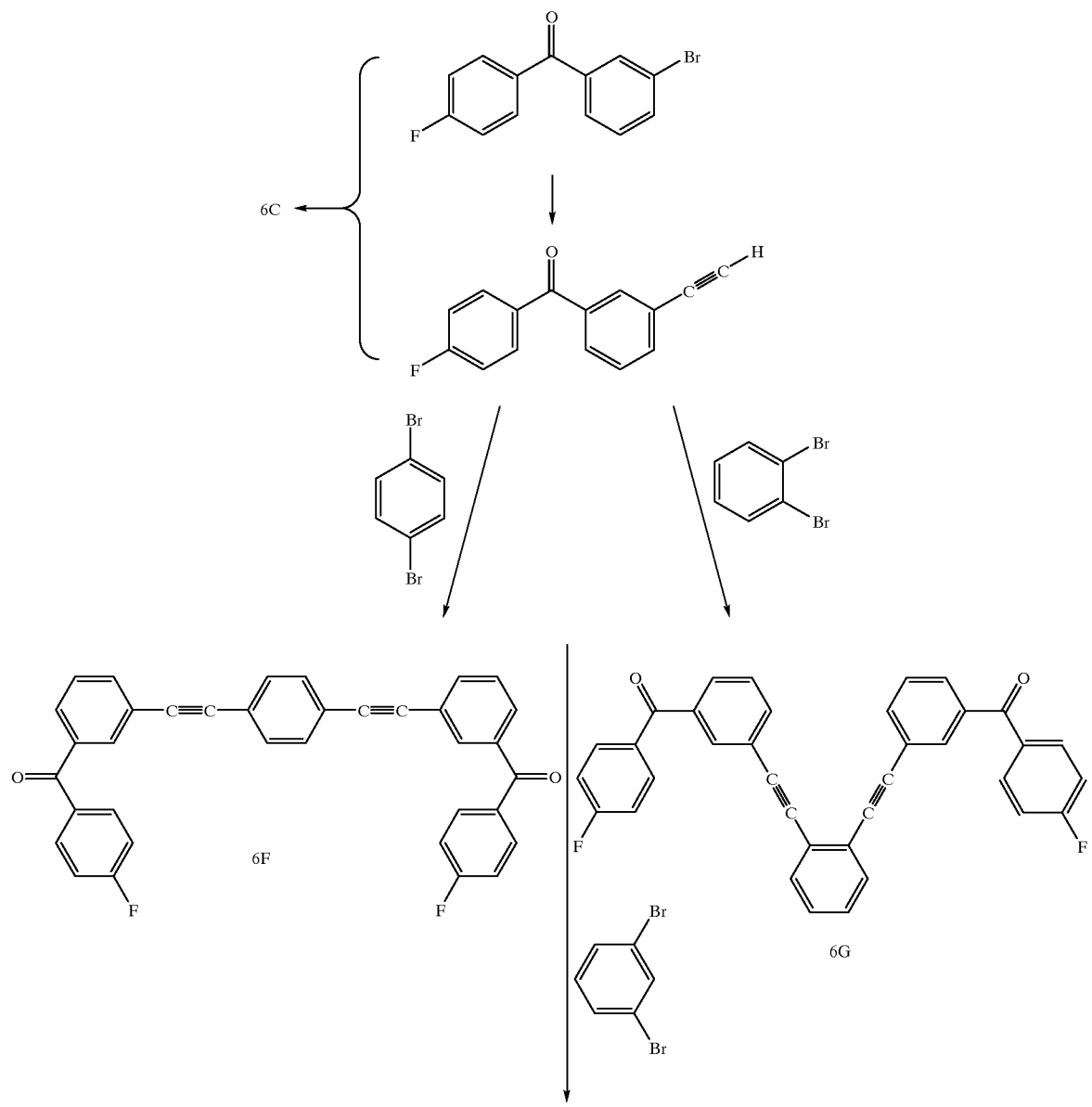

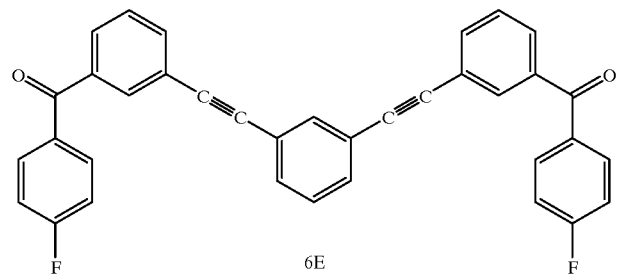
6E
A general synthetic pathway to structures in FIGS. 6D, 6H, 6I, and 6J is as follows:
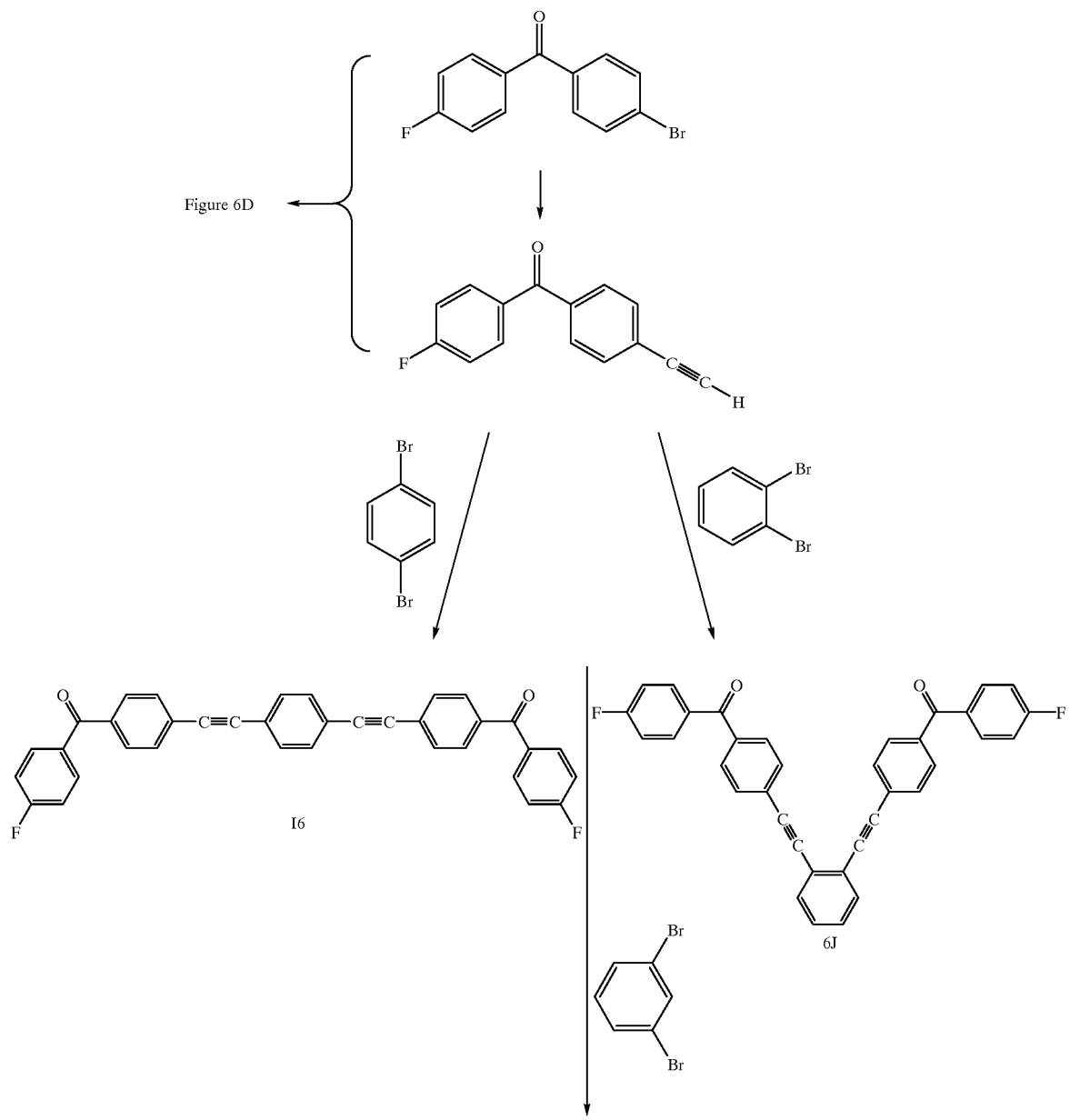

-continued

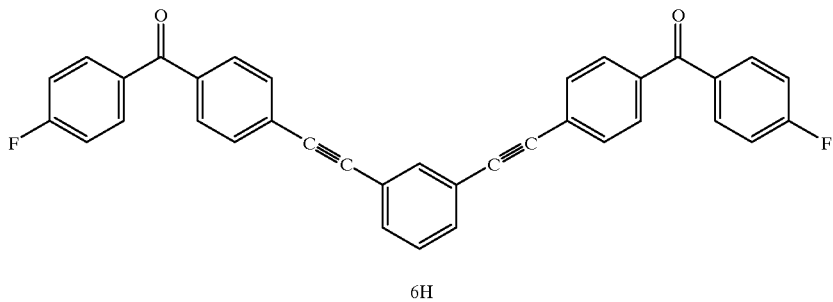

6H

Example 2

Figure 7:
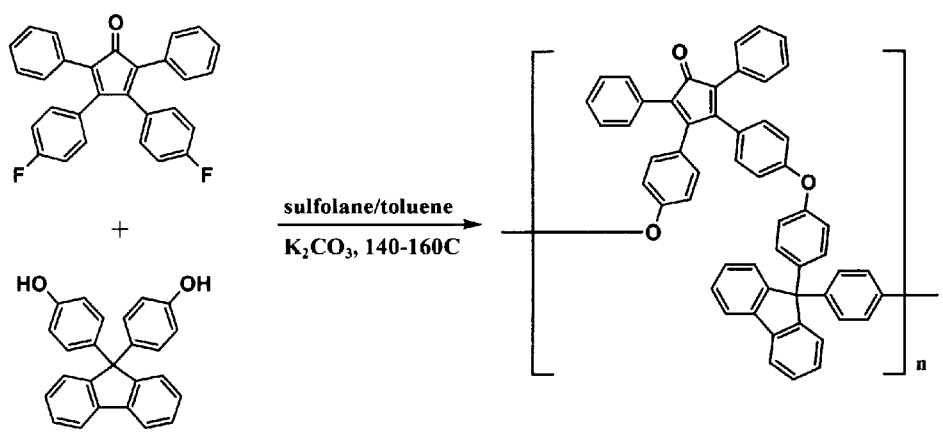
FIG. 7 is a synthetic scheme for producing a tetracyclone containing poly(arylene ether).

FIG. 7 is a general synthetic scheme for producing a tetracyclone (diene portion) containing arylene ether polymer. The polymerization of 4",4'"-difluoro-tetracyclone and commercially available fluorene bisphenol can be performed in sulfolane at various temperatures ranging from 140° to 180° C. for a period of approximately 3–24 hrs.

Synthesis of 4",4'"-Difluorotetracyclone

The condensation of 1,3-diphenylacetone and difluorobenzil in the presence of KOH in ethanol was straightforward and the synthesis was uneventful with the yields of 82–86%. The product can be purified by silica gel column or simply by boiling and washing with ethanol with no difference in the purity of the products.

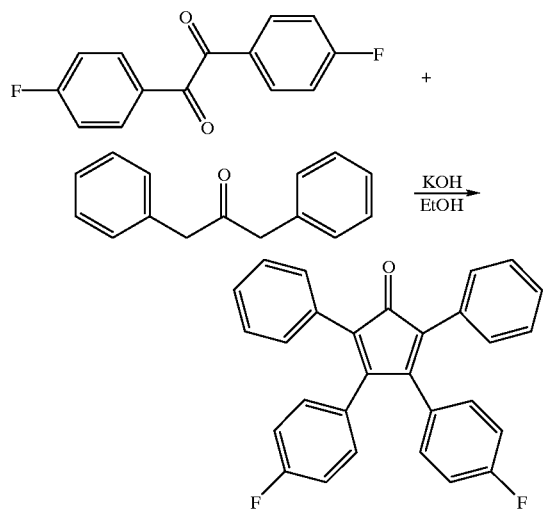

Commercially available 1,3-Diphenylacetone (4.29 g, 20.40 mMol) and 4,4'-difluoro-benzil (5.15 g, 20.92 mmol) were dissolved in 100 mL absolute ethanol. Difluorobenzil was completely dissolved into the solution at 50° C. to form a light yellow clear solution. The solution was further heated to just below boiling. The alkaline solution of potassium hydroxide (0.3 g) in 10 mL of water was added at this point. The color of the solution was changed to dark-red and purple. The reaction mixture was heated at reflux for 30 min. A dark-red purple precipitate was formed during this period. The reaction mixture was cooled in ice bath and suction-filtered. The dark red-purple crystal was washed with cold ethanol. The product was purified by silica gel column. Drying under vacuum at room temperature overnight afforded 7.0 g (82% yield) of dark red-purple crystals. The purity of the compound was confirmed by thin layer chromatography with only spot. $^1$H NMR: δ 6.8–6.9, m, 8 H; 7.1–7.3, m, 10 H. mp. 205°–207° C. Instead of column chromatography, the product was purified by boiling in ethanol and filtering. The crystals were then boiled in ethanol for a second time and filtered again.

Example 3

Figure 8:
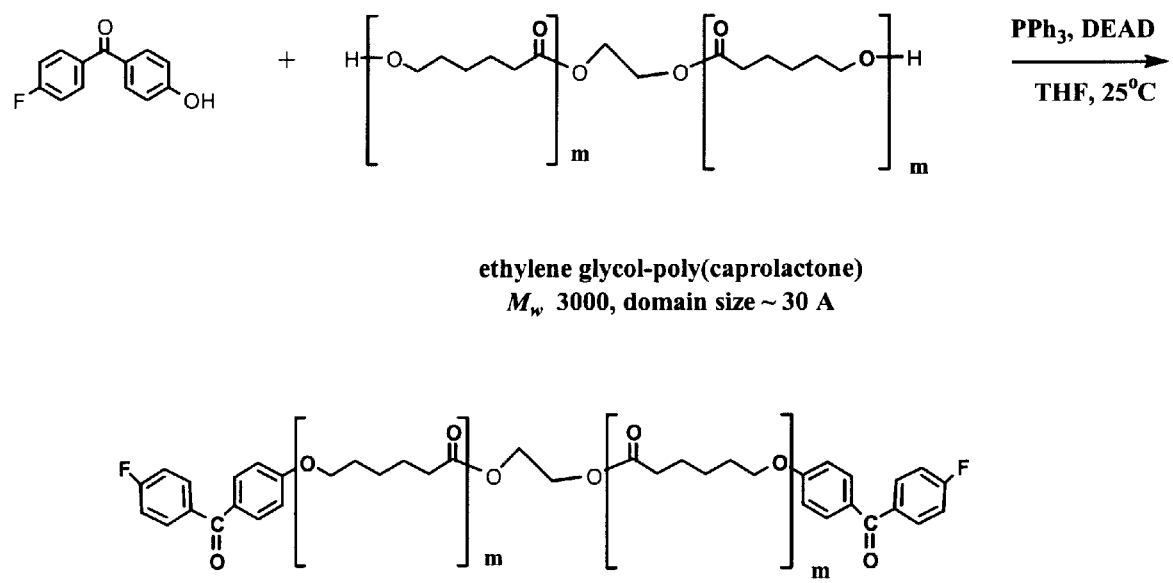
FIG. 8 is a synthetic scheme for producing a difluoroaromatic compound containing a thermally labile component.

FIG. 8 is a synthetic scheme for grafting a thermally labile component to a polymeric strand. In a particular experiment an about twofold molar excess of 3-fluoro-3'-hydroxybenzophenone over ethylene glycol-poly(caprolactone) ($M_w$~3000) are reacted to an difluoroaromatic endcapped ethylene glycol-poly(caprolactone). The so prepared end-capped ethylene glycol-poly-(caprolactone) can be employed in various molar fractions as the difluoroaromatic compound in a synthesis of a poly(arylene ether), thereby introducing a thermolabile portion into a polymeric strand having at least one type of a crosslinking functionality (e.g., a diene and/or dienophile).

Example 4

Figure 9:
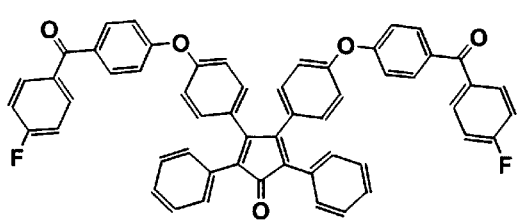
FIGS. 9–12 are structures of difluoroaromatic monomers for production of tetracyclone-containing poly(arylene ethers).
Figure 10:
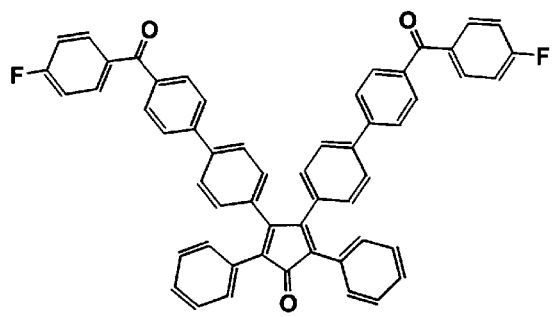

FIGS. 9–10 are contemplated alternative structures of various difluoroaromatic monomers that lead to tetracyclone-containing poly(arylene ethers), which can be employed in various molar fractions as the difluoroaromatic compound in a synthesis of a poly(arylene ether).

Example 5

Figure 11:
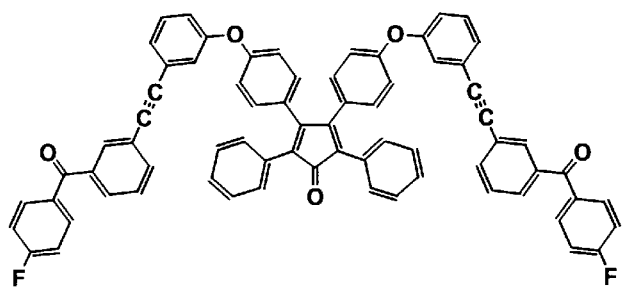
Figure 12:
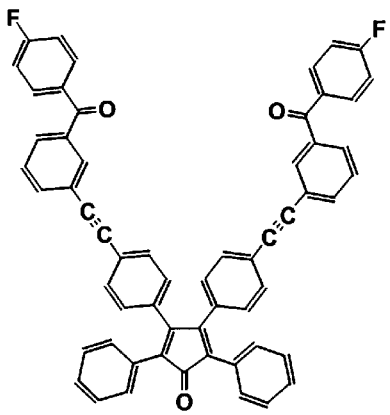

FIGS. 11–12 are contemplated alternative structures of various difluoroaromatic monomers that lead to poly(arylene ethers) containing both a tetracyclone moiety and an ethynyl moiety, which can be employed in various molar fractions as the difluoroaromatic compound in a synthesis of a poly(arylene ether). Poly(arylene ethers) incorporating these monomers can be employed to self-crosslink individual polymeric strands, since a single strand comprises both crosslinking functionalities required to crosslink a polymeric strand. In this case, first and second polymeric strand may be identical. It should be especially appreciated that even when a single strand crosslinks, a cyclic structure is formed de novo during crosslinking.

Thus, specific embodiments and applications of nanoporous polymers crosslinked via cyclic structures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of fabricating a nanoporous material, comprising:

providing a first polymeric strand and a second polymeric strand, wherein each of the first polymeric strand and the second polymeric strand independently comprises a crosslinking functionality and a thermostable portion, and wherein at least one of the first polymeric strand and the second polymeric strand further comprises a thermolabile portion;

crosslinking the first and second polymeric strands by reacting the crosslinking functionality of the first polymeric strand with the crosslinking functionality of the second polymeric strand, thereby forming a cyclic structure; and providing an energy to at least partially degrade the thermolabile portion.

2. The method of claim 1 wherein the cyclic structure comprises a monocyclic structure.

3. The method of claim 1 wherein the cyclic structure comprises a polycyclic structure.

4. The method of claim 1 wherein the cyclic structure comprises a conjugated double bond.

5. The method of claim 1 wherein the cyclic structure comprises an aromatic system.

6. The method of claim 1 wherein the cyclic structure is formed by a cycloaddition reaction.

7. The method of claim 1 wherein the cyclic structure is formed by a Diels-Alder reaction.

8. The method of claim 7 wherein the Diels-Alder reaction includes as reactants an ethynyl containing polymeric strand and a tetracyclone containing polymeric strand.

9. The method of claim 1 wherein the crosslinking functionalities comprise a $\pi$-bond.

10. The method of claim 1 wherein the crosslinking functionalities comprise a diene and a dienophile.

11. The method of claim 10 wherein the crosslinking functionalities comprise a tetracyclone and an ethynyl.

12. The method of claim 1 wherein at least one of the first and second polymeric strands comprises a block copolymer.

13. The method of claim 12 wherein the block copolymer is selected from the group consisting of a polyester, a polyether, a polyamide and a polyimide.

14. The method of claim 1 wherein the first and second polymeric strands are covalently coupled to each other.

15. The method of claim 1 wherein the thermolabile portion comprises an aliphatic compound.

16. The method of claim 15 wherein the thermolabile portion is selected from the group consisting of a ethylene glycol-poly(caprolactone), a polylactide, and a polylactate.

17. The method of claim 1 wherein the thermostable portion comprises an aromatic portion.

18. The method of claim 1 wherein the thermostable portion comprises a difluoro aromatic compound and an aromatic bisphenolic compound.

19. The method of claim 1 wherein the forming of the cyclic structure is a de novo forming of the cyclic structure during the crosslinking reaction.

20. The method of claim 1 wherein each of the first and second polymeric stands has a backbone, and the cyclic structure is formed from at least part of the backbone of at least one of the first and second polymeric strands involved in the crosslinking reaction.

\* \* \* \* \*